TRANSMITTER-CONTROLLED RECEIVER RECORDING SYSTEM

Filed March 27, 1950 2 Sheets-Sheet 1

Inventor
ELLISON S. PURINGTON.
By [signature]
Attorney

April 9, 1957 E. S. PURINGTON 2,788,389

TRANSMITTER-CONTROLLED RECEIVER RECORDING SYSTEM

Filed March 27, 1950 2 Sheets-Sheet 2

Inventor

ELLISON S. PURINGTON.

By

Attorney

United States Patent Office 2,788,389
Patented Apr. 9, 1957

2,788,389

TRANSMITTER-CONTROLLED RECEIVER RECORDING SYSTEM

Ellison S. Purington, Gloucester, Mass., assignor to John Hays Hammond, Jr., Gloucester, Mass.

Application March 27, 1950, Serial No. 152,174

1 Claim. (Cl. 178—6.7)

This invention relates to a system for transmitting, receiving and recording a still picture, using the facilities of a standard television transmitter.

In copending applications, U. S. Serial Nos. 38,073, 124,419 and 129,951 have been shown systems for such purposes which utilize the audio channel of the transmitter for coordinating the timing of the still picture transmission and the recorder operation. Application Serial No. 38,073 is now Patent No. 2,611,027, granted September 16, 1952. Application Serial No. 124,419 is now Patent No. 2,585,034, granted February 12, 1952.

The present invention relates specifically to a system in which the video channel which conveys the picture is also used to coordinate the timing of the still picture transmission and the recorder operation.

This present arrangement is especially useful when the receiver can be so arranged that no time consuming mechanical changes are necessary before the recorder can be set into operation. Although the amount of time required by the video channel is slightly increased, the audio channel is free to be used for other purposes and the operation is in general considerably simplified.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which—

Figure 1:
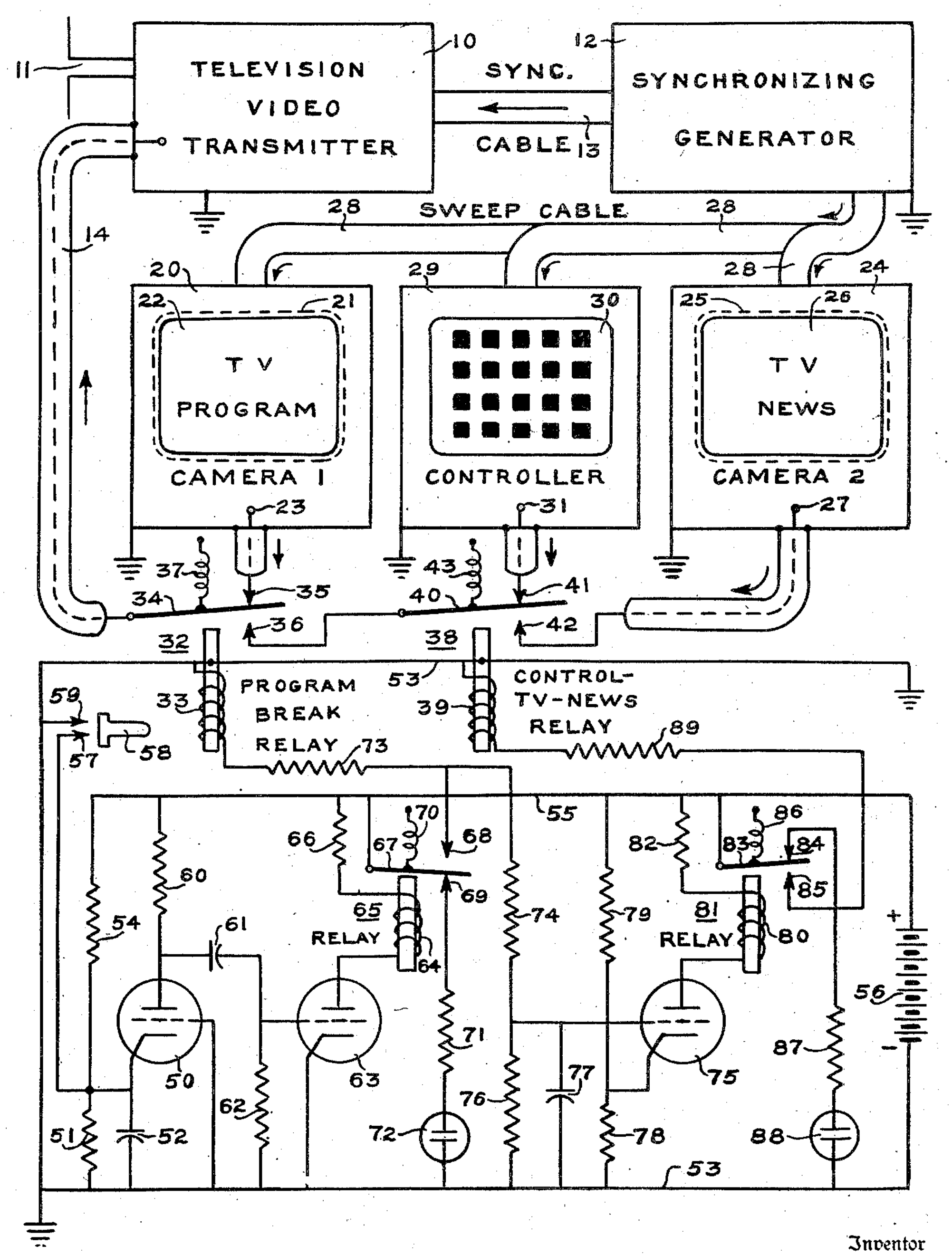
Figure 2:
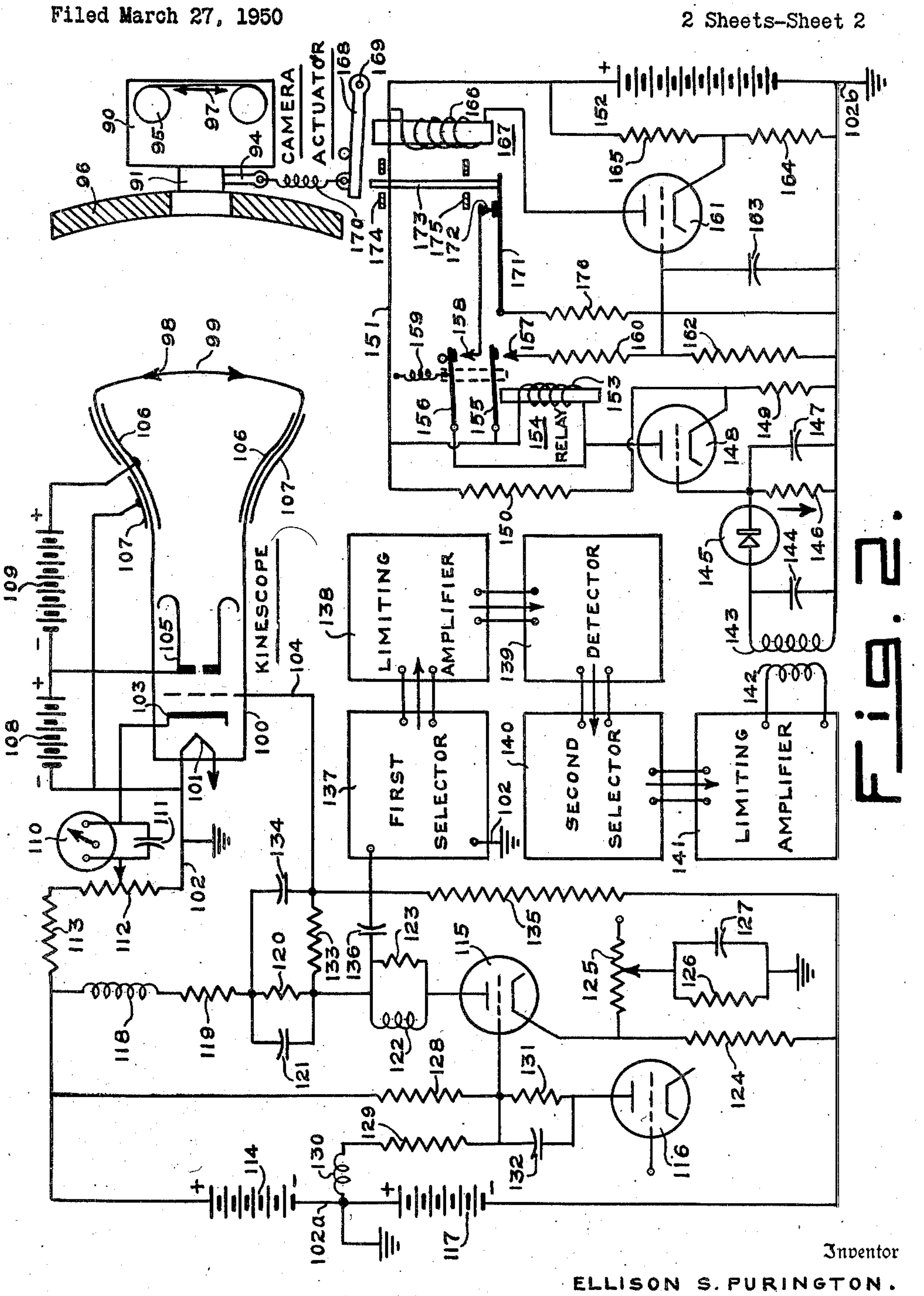

Fig. 1 is a schematic diagram showing the circuits of the transmitter in one embodiment of the invention, and Fig. 2 is a schematic diagram showing the circuits of the receiver.

In the following description parts will be identified by specific means for convenience, but they are intended to be generic in their application to similar parts.

In Fig. 1, a standard television transmitter 10 with a radiator 11 is fed with synchronizing signals for the receiver from a synchronizing generator 12, using a connecting cable 13, and is fed with video signals over a line 14. These video signals may originate in a camera system 20 used for transmission of regular programs or advertising material, or in a camera system 24 used for transmitting a still picture or news material to be recorded, or in a controller circuit 29. The method of selecting the source of signals to be connected to the transmitter will be described subsequently. The synchronizing generator 12 is connected by sweep cable 28, carrying horizontal and vertical sweep frequency signals, to cameras 20 and 24 and to controller 29. Associated with cameras 20 and 24 may be monitoring kinescopes 21 and 25 which show on screens 22 and 26 the nature of the available video output at the camera output terminals 23 and 27. The controller 29 is a device which produces a wave form from the sweep inputs which is distinctively different from that produced by the cameras. Thus for example, the controller may create a wave of frequency which is an integral multiple of the horizontal sweep frequency and which is modulated by an integral multiple of the vertical sweep frequency, with the resultant voltage available at the controller output terminal 31. Preferably there should be no output voltage at terminal 31 while synchronizing signals for use at the receiver are being transmitted. That is, the output at 31 may also be modulated at the fundamental of both the line and field frequencies. As an example, a kinescope associated with the controller, with horizontal and vertical sweeps, would depict a video pattern as for example a checkerboard type pattern such as indicated by 30. Other types of controller patterns may be used, for example using a wave of fundamental frequency which is not an integral multiple of the horizontal sweep frequency, such as 15.5 times the horizontal sweep frequency; moreover, this fundamental wave may be frequency modulated instead of amplitude modulated. The requirements are merely that the controller output pattern be different from the output of television cameras to an extent such that the controller may actuate a distant receiver mechanism which will not respond to the output of the cameras.

For controlling the connection from program camera 20, TV-news camera 24 and controller 29 to the television transmitter 10, there is provided a program break relay 32 and a control-news relay 38, which may be single pole double throw relays of identical construction. Thus relay 32 with winding 33 has an armature 34, with back contact 35 and front contact 36, with the armature 34 normally held against the back contact 35 by spring 37. Similarly relay 38 with winding 39 has an armature 40, back and front contacts 41 and 42, with spring 43. Armature 34 is connected by line 14 to the transmitter 10; contact 35 is connected to the program output terminal 23; contact 36 is connected to armature 40; contact 41 is connected to controller output 31, and contact 42 is connected to the TV-news camera output 27. It will be understood that the connections are by coaxial cables with the outer conductors grounded.

The relay connections above described are such that normally the program camera 20 furnishes video signals to the transmitter. When the relay 32 is actuated, the regular program from camera 20 is broken, and the signal for the transmitter is taken from controller 29 or from TV news camera 24 in accordance with the position of the armature of control-news relay 38.

To provide for the proper operation of the relays 32 and 38, an electronic timer circuit is used. A first timer determines the total time that the program camera 20 is disconnected by relay 32, while a second timer determines the amount of the time that the controller 29 is connected to the transmitter, leaving the TV news camera to be connected the balance of the time that the regular program is interrupted. It will be understood that the relays 32 and 38 are sufficiently quick acting so that the amount of time that no signal passes to the transmitter is negligible.

Triode 50 has a cathode connected through resistor 51 bypassed by capacitor 52 to ground line 53, and connected through resistor 54 to high voltage line 55 which is connected to the positive end of a battery 56 or equivalent voltage source, the negative side of which is connected to ground. The grid of triode 50 is connected to ground line 53. For initiating the timing operation, the resistor 51 is shunted by a push button 58 having one contact 57 connected to the cathode of tube 50 and the other contact 59 connected to ground. The anode plate of triode 50 is connected through resistor 60 to HV line 55, and is connected through timing capacitor 61 and resistor 62 to ground line 53. The junction of capacitor 61 and resistor 62 is connected to the grid of a triode 63, the cathode of which is connected to ground line 53 while its anode is connected through winding 64 of a relay 65 and a resistor 66 to HV line 55. The relay 65 is a single pole double throw relay with an armature 67, connected to line 55, back contact 68, front contact 69 and spring 70 holding the armature in contact with the back contact 68 when the relay ceases to be sufficiently energized. The front contact 69 is connected through resistor 71 and indicating glow lamp 72 to ground line 53. The back contact 68 is connected through resistor 73 and the winding 33 of the program break relay 32 to the ground line 53.

The elements of the timer so far described constitute the first timer step. Constants are so chosen that with the push button 58 open as indicated, the cathode of tube 50 is biased positively by the current from battery 56 flowing through resistors 54 and 51, so that little or no current flows in the resistor 60 to the anode of tube 50. However, triode 63 normally has its grid and cathode both at ground potential and normally sufficient current passes through the winding 64 to the anode of tube 63 so that the armature 67 is held on front contact 69, causing indicator lamp 72 to glow. When push button 58 is depressed, the cathode and grid of tube 50 become of the same ground potential. At the moment of closure, anode current flows through resistor 60, depressing the voltage of the anode of tube 50, and pulsing the grid of tube 63 highly negative. Current in the winding 64 is discontinued and the relay 65 is released causing current to flow from the battery 56 through resistor 73 and winding 33 of program break relay 32, causing the armature 34 to be shifted to disconnect the output of camera 20 from the transmitter and connect armature 40 of the control-news relay to the tranmitter. After a suitable period of time, capacitor 61 changes sufficiently in potential, the grid of tube 63 is restored toward its normal ground potential, the relay 65 pulled in and relay 32 released and the program restored. The amount of interruption is determined in part by choice of the capacitance of capacitor 61, and may be of the order of .4 second corresponding to twelve standard TV frames.

For controlling the operation of the control-news relay 38, a second timer is provided, initiated by release of the relay 65. Thus the back contact 68 is also connected through resistor 74 to the grid of a triode 75, which in turn is connected through a resistor 76, shunted by capacitor 77, to ground line 53. The cathode of triode 75 is connected to ground line 53 through resistor 78 and to the HV line 55 by resistor 79. The anode of triode 75 is connected through the winding 80 of a single pole double throw relay 81, and through a resistor 82 to the HV line 55. Relay 81 has an armature 83, back contact 84 and front contact 85, and the armature normally is biased to close back contact 84 by a spring 86. The back contact 84 is connected through resistor 87 and indicator lamp 88 to the ground line 53. The front contact 85 is connected through resistor 89 to one end of winding 39 of relay 38, the other end of which is connected to ground line 53.

The circuits of the second timer step are so arranged that normally with no current flowing in resistor 76, and the grid of triode 75 therefore at ground potential, the cathode of triode 75 is biased sufficiently positive that little or no current flows through the relay winding 80 of relay 81. Therefore normally current flows from the HV line 55 through armature 83, contact 84, resistor 87 and indicator lamp 88 to ground line 53. Upon closure of the prior relay 65, however, current flows through resistor 74 to charge capacitor 77 shunted by resistor 76. When sufficient voltage has built up on capacitor 77, the triode 75 passes current, operating relay 81, and causing current to flow from HV line 55 through armature 83, front contact 85, resistor 89 and winding 39 of relay 38. This operates the relay 38, disconnecting the controller 29 from the transmitter 10 and connecting the TV news camera 24 to the transmitter 10.

It is therefore seen that when button 58 is pushed, almost instantaneously the program is discontinued and the controller 29 is first connected to the transmitter. After a time delay determined in part by the choice of the capacitance of capacitor 77, the relay 38 operates to disconnect the controller and connect the TV news camera 24 to the transmitter. After further time delay, the push button 58 still being held down, the first timer circuit is restored, the program break relay is restored and the camera 20 is reconnected to the transmitter. Thereupon the capacitor 77 discharges, the relay 81 is reset and the armature 40 reconnected to controller 29 in readiness for the next operation of the push button. Subsequently, push button 58 may be released, but this will not cause further actuation of relay 65 since the pulse on the grid of triode 63 due to the change in current to the anode of tube 50 is in such a sense as to increase the current in the winding 64, which already is sufficient to hold the relay 65 closed.

It will be understood that after the capacitor 77 is charged, and relay 65 operates at the end of the cycle for the first timer step, the capacitor 77 discharges through resistor 75 and also through resistor 74, 73 and relay winding 33. However the constants are such, with resistor 74 of high resistance compared with the resistances of 73 and winding 33, that the current from capacitor 77 through winding 33 is insufficient to hold the relay 32 closed after relay 65 operates.

The amount of time that the program is interrupted for transmission of the control signal and its following TV news message is indicated by the time that the glow lamp 72 is extinguished. This lamp may be located, if desired, near the operator of the push button 58, and serve to indicate when the button may be released. Similarly the interval that the controller is on may be judged by the time which elapses after lamp 72 is extinguished before lamp 88 is extinguished. When both lamps glow, the circuit is in an operative condition ready for push button operation. It will be understood that after one use of the push button to transmit the control signal and the TV news material, a considerable period should elapse, say five seconds, before the push button is again used, during which time the voltages across the capacitors 61 and 77 will have reached equilibrium to a sufficient degree. It will be further understood the lamp circuits may be so chosen that the current drain on the source 56 is not changed appreciably by the operation of a relay.

If the circuit is not in continuous operation, and is energized for example by a power pack driven from an A. C. source, it may be desirable to insert a switch in the lead to contact 68 of relay 65, which will not be closed until indicator lamp 72 shows that the normal condition is reached with no voltage on contact 68. Conversely this switch should be opened prior to discontinuing power for the electronic timer. In this manner, the relay 32 will not be actuated due to the operations of turning the timing circuit on and off.

In Fig. 2 is shown the circuits of the receiver cooperating with the transmitter circuit of Fig. 1. This includes a camera or other recorder 90, provided with the usual lens and iris and a shutter 91, controllable by a shutter lever 94. These camera parts are not shown in detail, as they are well known. However it should be noted that the shutter mechanism is of the type which does not require separate cocking and triggering, but operates on a single motion of the shutter lever. The camera is provided with a film 95 or other recording medium, and may be directed through a hole in a concave mirror 96 so that when the shutter is actuated, a latent image 97 will be formed on the film 95 corresponding to the picture 98 on the screen 99 of a kinescope 100. The mirror 96 may be an element of an optical system, such as a Schmit projector, for use in causing the picture on the screen 99 to appear also on a different screen, not shown. The kinescope 100, may be of a conventional type, with a heater 101, with one terminal connected to ground line 102; a cathode 103; a control grid 104; an anode 105, a high voltage inner coating 106 and a grounding coating 107; together with focussing and deflection coils not shown. Batteries 108 and 109 or the equivalent voltage sources are provided with the negative end of battery 108 connected to ground line 102, the positive end of battery 108 connected to anode 105 and to the negative end of battery 109, the positive end of which is connected to the inner coating 106. The outer coating 107 is connected to ground line 102, and the other filament terminal is connected to a source of filament voltage not shown. The cathode 103 is connected through a D. C. meter 110 by-passed by capacitor 111 to an adjustable tap of a potentiometer 112, one end of which is grounded and the other end of which is connected through a resistor 113 to the positive end of a battery 114, the other end of which is connected to ground line 102*a*.

For driving the kinescope 100, a D. C. type video amplifier is used, with triodes 115 and 116 powerized from battery 114 and also a battery 117, the positive end of which is connected to ground line 102*a*. The circuits for the last stage using triode 115 are shown, it being understood that the triode 116 is driven from the detector by suitable circuits not shown, which detector also furnishes A. V. C. voltage and synchronizing voltage for the kinescope 100 by circuits not shown.

The positive end of battery 114 is conductively connected to the anode of triode 115 through inductor 118, resistor 119, resistor 120 paralleled by capacitor 121, and inductor 122 paralleled by resistor 123. The cathode of triode 115 is conductively connected through resistor 124 to the negative side of battery 117, and is also conductively connected through a rheostat 125, and resistor 126 paralleled by capacitor 127 to ground. The grid of triode 115 is conductively connected through resistor 128 to the positive side of battery 114; through resistor 129 and inductor 130 to ground line 102*a*, and through resistor 131 paraleled by capacitor 132 to the anode of the preceding triode 116. Thus it is seen that the operating voltages of triode 115 are established by constants of the circuits which conductively connect the elements of the triode to the ends of the batteries 114 and 117 and the ground connections between them. The kinescope grid 104 is also conductively connected into the output circuit of triode 115 by resistor 133 to the junction of resistors 120 and 123, and also operatively connected to the output circuit by capacitor 134 paralleling resistors 120 and 133 in series, and also operatively connected through resistor 135 to the negative end of battery 117. Therefore the kinescope is also direct connected to the video amplifier system. The constants of the system are so chosen that the kinescope 100 and triode 115 function properly, with the kinescope brightness and contrast controllable by potentiometer 112 and rheostat 125. The average brightness is indicated by the reading of meter 110 which can be maintained proper both for TV program purposes and TV news purposes by adjustment of control 112.

These circuits although conventional, are here set forth to show the manner in which the signal for controlling the shutter of the camera 90 may be taken off the video circuit. This signal is here derived from the output of the triode 115 and therefore is proportional to the signal at the grid of the kinescope. Therefore manual and automatic volume control adjustments which make the picture proper for visual observation will also set the control signal at a definite level, since the controller pattern at the transmitter is at a definite level with respect to the level from the program source. The control signal is taken from the video circuit by a capacitor 136 with one end connected to the junction of resistors 120 and 123 and the other connected to a first control selector 137. This control selector includes a circuit tuned to the fundamental high frequency of the controller pattern, and its output is fed through a limiting amplifier 138, for bringing it to a proper level, if desired, to a detector 139, where current is produced of frequency corresponding to the modulation of the high frequency fundamental of the control pattern. This detector can be of the conventional discriminator or back to back detector type if the modulation is by frequency or phase variation. The output of the detector is fed through a second selector 140 tuned to the fundamental of the modulating frequency, the output of which passes through a limiting amplifier 141, if desired, to produce control frequency current in a coil 142 connected to the limiting amplifier output. The circuits of blocks 137, 138, 139, 140 and 141 are well established in the art and are therefore not described in detail. They are set forth to show one manner in which control current can be made available in coil 142 only when the transmitter and receiver are actuated by the controller circuit 29 of Fig. 1, prior to the transmission of the TV news signal.

The coil 142 is coupled to a coil 143 tuned by capacitor 144 to the control signal frequency. One end of capacitor 144 is connected to the anode of a rectifier 145, the cathode of which is connected through resistor 146 to ground and to the other end of capacitor 144. The resistor 146 is shunted by smoothing capacitor 147, and its junction with the cathode of rectifier 145 is connected to the grid of a relay triode 148. The cathode of this triode is connected to ground line through resistor 149, and is connected through resistor 150 to the HV line 151 connected to the positive end of a battery 152 the other end of which is connected to ground 102*b*. The anode of triode 148 is connected through the winding 153 of a relay 154 to the HV line 151. This relay has two armatures or leaves 155 and 156, the former connected to the HV line 151 and the latter connected to the anode of triode 148. Front contacts 157 and 158 are provided for these armatures which are normally both held away from these contacts by a spring 159. It will be understood these armatures operate together, being mechanically connected by insulating material.

Contact 157 is connected through resistor 160 to the grid of a triode 161 which in turn is connected through resistor 162 paralleled by capacitor 163 to ground. The cathode of triode 161 is connected through resistor 164 to ground, and through resistor 165 to the positive end of battery 152. The anode of triode 161 is connected through winding 166 of a shutter actuator 167 to the HV line 151. This actuator is provided with an armature 168 pivoted at 169, and connected by a spring 170 to the shutter lever 94 of camera 90 in such a manner that the shutter is cocked and tripped when the actuator armature 168 is drawn down to the pole piece. When the actuator is de-energized, the shutter actuator is drawn away from the pole piece by the spring 170 in series with the spring mechanism in the shutter mechanism, not shown. Associated with the actuator is a spring leaf 171 normally in contact with a back contact 172 when the armature of the actuator is retracted as in the position shown. An insulating rod member 173 held in guides 174, 175 is arranged so that when the actuator armature is pulled in, the contact between leaf 171 and back contact 172 is broken. The contact 172 is connected to the front contact 158 for the armature leaf 156 of relay 154, and the leaf 171 is connected through resistor 176 to ground.

In the operation of the system, when the signal in the video circuit of the receiver corresponds to the distinctive control signal produced by controller 29 of Fig. 1, then a voltage will appear across condenser 144 of frequency corresponding to the rate of modulation of the control signal. The circuits of triode 148 are so adjusted that the cathode is normally biased positively with respect to the grid so that little or no anode current flows, and the relay 154 is open. When the control signal operates the rectifier 145, producing rectified current in the grid return circuit of triode 148, and increasing the potential on the grid of that triode, the relay 154 operates. Upon closure, the anode of triode 148 is connected through armature 156, contact 158, contact 172, leaf 171 and resistor 176 to ground, and since the anode is connected through relay winding 153 to line 151, current will continue to flow through the winding 153 even after the control signal has ceased. That is, the contacts 158 and 172 are a part of a holding circuit. When the relay 154 operates, current flows from HV line 151 through armature 155, contact 157 and resistor 160 to charge capacitor 163 shunted by discharge resistor 162. The triode 161 is normally so cathode biased that with no voltage on the capacitor 163, little or no current passes through winding 166 of the shutter actuator 167. After a suitable delay such that the control signal has ceased and the TV news signal is producing the desired picture on the kinescope 100, the voltage across capacitor 163 becomes sufficient to cause the triode to pass current operating the actuator 167, causing the shutter of camera 90 to be cocked and tripped, registering a latent image 97 or other recording surface 95. At the end of the stroke, after the shutter has snapped, the actuator opens the connection between leaf 171 and contact 172, thereby eliminating the holding current through the winding 153, and restoring the relay 154 to normal. It is understood that other methods of causing the capacitor 163 to charge after the control signal has ceased and until the shutter has tripped can be used. For example, it is well known that the time constant of a rectifier system on charging a capacitor can be much shorter than the time constant on discharge, and moreover that a relay armature once pulled in by a given current will not drop out until the current has dropped far below the pull-in current value. Therefore with capacitor 147 suitably chosen, it is possible to provide a system which does not require the holding feature. However the present arrangement is more desirable if it is required to reset the receiver mechanism immediately after taking the camera picture, so that a second control signal and TV news signal may be sent and recorded without improper timing. In the present invention, therefore, the capacitance of 147 will be so chosen that it will be substantially discharged when the shutter trips; and moreover the delay circuit including capacitor 163 will be so chosen that it will be substantially discharged before the relay 154 again closes.

It will be understood that the latent image recorded in camera 90 may be developed and utilized in any desired manner.

Although only a few of the various forms in which this invention may be embodied have been shown herein, it is to be understood that the invention is not limited to any specific construction but might be embodied in various forms without departing from the spirit of the invention or the scope of the appended claim.

What is claimed is:

A system for transmitting over a television channel and automatically recording a still picture during a break in a continuous television program, comprising a television transmitter responsive to television signals, a source of television signals having means producing signals representing a continuous television program, a second source of television signals having means producing a signal representing a predetermined control pattern image, a third source of television signals having means producing signals representing a still picture, a selector circuit having selector means selectively connecting said sources to energize said transmitter and normally connecting said first source to said transmitter, and timed control means for operating said selector means to disconnect said first source and connect said second source to said transmitter and then to disconnect said second source and connect said third source to said transmitter in a timed sequence, and a television receiver having means responsive to received television signals to produce an image on a television screen, a camera focussed on said screen and having means photographing said image on a sensitized surface, said camera having a shutter, a control member for said shutter, a trip circuit to actuate said control member, and a circuit having selector means responsive to said control pattern signals and having timed means for energizing said trip circuit simultaneously with the transmission of said still picture by said transmitter, whereby said still picture is photographed onto said sensitized surface.

References Cited in the file of this patent

UNITED STATES PATENTS

| | | |
|---|---|---|
| 2,193,869 | Goldsmith | Mar. 19, 1940 |
| 2,225,408 | Carlisle | Sept. 9, 1941 |
| 2,275,898 | Goldsmith | Mar. 10, 1942 |
| 2,420,029 | Brady | May 6, 1947 |
| 2,429,921 | Brady | Oct. 28, 1947 |
| 2,504,734 | Schmidling | Apr. 18, 1950 |
| 2,513,176 | Homrighous | June 27, 1950 |
| 2,585,034 | Purington et al. | Feb. 12, 1952 |
| 2,611,027 | Hammond | Sept. 16, 1952 |
| 2,611,819 | Serrell | Sept. 23, 1952 |
| 2,623,117 | Hammond | Dec. 23, 1952 |
| 2,642,492 | Hammond | June 16, 1953 |